United States Patent Office 2,776,197
Patented Jan. 1, 1957

2,776,197
COMPOSITIONS AND METHODS OF INFLUENCING THE GROWTH OF PLANTS

Hans Gysin, Basel, and Enrico Knüsli, Riehen, near Basel, Switzerland, assignors to J. R. Geigy A. G., Basel, Switzerland, a Swiss firm No Drawing. Application August 23, 1954, Serial No. 451,718

Claims priority, application Switzerland September 2, 1953

12 Claims. (Cl. 71—2.4)

The present invention is concerned with compositions which, due to their content of O-aryl carbamates, change or regulate the development of plant cells and so influence the growth of plants. It is also concerned with a method by which the growth characteristics of plants can be modified by the use of the active substances mentioned above.

It is known that N-phenyl carbamates of the general formula:

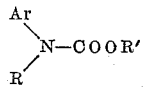

wherein R represents hydrogen or a low molecular alkyl radical, R' represents an alkyl group and Ar represents a phenyl radical substituted or unsubstituted as desired, have attained great importance because of their selective action as weed killers. Reference is made in this respect to N-phenyl-isopropyl carbamate (IPC) and N-(3-chlorophenyl)-isopropyl carbamate (CIPC).

Surprisingly, it has now been found that O-aryl carbamates of the general formula:

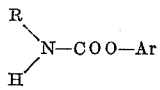

wherein Ar represents an aryl radical substituted by alkyl alkoxy, or alkyl mercapto, amino or substituted amino or nitro groups or by halogen, and R represents hydrogen or a straight chain lower alkyl radical, have very marked influence on the growth of plants. Depending on the concentration and formulation as well as the mode of application, by which latter is understood in particular the choice of the time of application and the part of the plant to be treated, the influence on the growth of the plant can not only be an inhibitory but also a stimulating one. Particularly remarkable, in contrast to O-isopropyl-N-phenyl carbamate, is the increased stimulating action of some of the active substances usable according to the present invention in the inducement and stimulation of root formation. Nothing is known up to the present of a similar action of O-isopropyl-N-phenyl carbamate. There are therefore, increased and more different possibilities for the practical application of the O-aryl carbamates.

The following useful applications due to stimulating action can be cited:

Promotion of the germination of seeds, of the sprouting of bulbs and rhizomes, of bud shooting, or root growth,
Inducement and stimulation of the root formation of cuttings,
Prevention of pre-harvest fall of fruits,
Enhancement of the effect of fertilisers.
Applications due to inhibitory action are:
Inhibition or delaying of germination and
Prolongation of the harvest state of vegetables and fruits,
In addition
Modification of the leaf structure to increase productivity,
Delaying the blossom,
Blossom thinning,
Desiccation of crop plants,
Defoliation (complete or partial),
Selective weed killing,
Total eradication of plants.

In addition, in certain circumstances, parthenogenesis and production of seedless fruits can be attained.

Though several of the reactions listed above can often be attained with the same substance under chosen conditions and in particular, the purely toxic effects leading to the death of the plant can be caused by increasing the concentration, there are naturally differences and preferred indications for the various application purposes which can result even if the action is, in principle, the same, e. g. from the differences in the transportation of the absorbed active substance in the plant.

In the control of weeds, compounds which have a general toxic effect in a very low concentration are important. In addition, other compounds are of interest which also, possibly in higher concentrations, have a selective action, i. e. they do not affect the useful plants.

Dependent on the intended use and the form of application, the concentration of the active ingredient in formulations ready for use can vary within wide limits. High concentrations can be used in particular in dusts for the treatment of the soil and fairly high concentrations from about 0.1–2% can be used for application to a part of the plant only, e. g. for powdering the ends of cuttings the root formation of which is to be stimulated. Low concentrations can be used for example in emulsions in which cuttings are dipped or placed for a long time to stimulate root formation. Very low concentrations can be used also when the active ingredients are applied to the soil in water (by watering) or in fertilisers. In soil treatment, there is, in general, no necessary relationship between the concentration and the amount of active ingredient taken up by the plant, since a lower concentration of active ingredient can be equalised by increasing the total amount of the agent applied. There is therefore, a very great range of possible concentrations.

Directly dependent on the concentration however, is the amount of active ingredient taken up by the plant when it is applied in aqueous suspensions and emulsions which are sprayed on to the parts of the plant above the ground, in particular on to the leaves up to the run-off point. The concentration for such agents lies between about 0.01% and 2%. These agents are prepared immediately before use from concentrates, the concentration of active ingredient of which is many times that of the agent to be applied and in cases of concentrates for the preparation of emulsions of liquid active ingredient and for the preparation of suspensions of solid active ingredient, the concentration can be as high as about 90%.

The following compounds for example can be used as active ingredients according to this invention:

1. O - (2 - methyl - phenyl) - carbamate _____ M. P. 157–158°.
2. O - (4-methyl - phenyl) - carbamate _____ M. P. 153–154°.
3. O - (2.4 - dichlorophenyl)-carbamate _____ M. P. 135–138°.
4. O - (2 - methyl-phenyl)-methyl carbamate _____ M. P. 98–101°.
5. O - (4 - methyl-phenyl)-methyl carbamate _____ M. P. 94-95°.
6. O-(2.4-dichlorophenyl)-methyl carbamate _____ M. P. 84–86°.
7. O - (2-methyl-phenyl) - ethyl carbamate _____ B. P. 13 155–156°.
8. O - (4 - methyl-phenyl) - ethyl carbamate _____ M. P. 112–114°.

9. O - (2.4-dichlorophenyl)-ethyl carbamate _____ M. P. 107–109°.
10. O-(2-methyl-phenyl)-n-propyl carbamate _____ B. P. $_{0.13}$ 101–102°.
11. O-(4-methyl-phenyl)-n-propyl carbamate _____ M. P. 90–93°.
12. O - (4-chlorophenyl)-n-propyl carbamate _____ M. P. 100°.
13. O - (2.4 - dichlorophenyl)-n-propyl carbamate _____ M. P. 91–92°.
14. O - (2-methyl-phenyl)-n-butyl carbamate _____ B. P. 140–141°.
15. O - (4-methyl-phenyl)-n-butyl carbamate _____ M. P. 88–90°.
16. O - (2 - chlorophenyl)-n-butyl carbamate _____ B. P. $_{0.04}$ 123–125°.
17. O - (4 - chlorophenyl)-n-butyl carbamate _____ M. P. 103–104°.
18. O -(2-methyl-phenyl)-isoamyl carbamate _____ B. P. $_{0.2}$ 144–147°.
19. O -(4-methyl-phenyl)-isoamyl carbamate _____ M. P. 97–99°, B. P. $_{0.15}$ 122–124°.
20. O - (4 - methyl - phenyl)-allyl carbamate _____ M. P. 76–77°.
21. O-(4-tert. amyl-phenyl)-allyl carbamate _____ M. P. 74–76°.
22. O - (4 - chlorophenyl) - allyl carbamate _____ M. P. 95–97°.
23. O - phenyl - cyclohexyl carbamate _____ M. P. 139–140°.
24. O - (2 - methyl-phenyl)-cyclohexyl carbamate _____ M. P. 139–140°.
25. O - (4 - methyl-phenyl)-cyclohexyl carbamate _____ M. P. 150–152°.
26. O-(4-tert. amyl-phenyl)-ethyl carbamate _____ M. P. 52–54.5°.
27. O - (2.4.5 - trichlorophenyl)-carbamate _____ M. P. about 136° under decomposition.
28. O - (2.4.5 - trichlorophenyl)-ethyl carbamate _____ B. P. 111.5–113.5°.

Some of the carbamates are known. The others can be produced according to methods known per se. Technically suitable in particular is the condensation of reactive carbonic acid derivatives such as, e. g. carbamic acid halides or isocyanates with phenols or the reaction of chloroformic acid aryl esters with amines.

As starting materials for the production of carbamates which according to the invention can be used for influencing plant growth, the following phenols and amines for example are suitable: 2-cresol, 3-cresol, 4-cresol, dimethyl phenols; isopropyl phenols, 4-n-butyl phenol, 4-tert. butyl phenol, 4-tert. amyl phenol, 3.5-di-tert. butyl phenol, iso-octyl phenols, nonyl phenol, 4-lauryl phenol, 4-cyclohexyl phenol, guaiacol, 2-ethoxy phenol, 3-methoxy phenol, 4-ethoxy phenol, 3-butoxy phenol, 4-methylmercapto phenol, 4-isoamylmercapto phenol, 2-chlorophenol, 3-chlorophenol, 4-chlorophenol, 2.4-dichlorophenol, 2.5-dichlorophenol, 3.4-dichlorophenol, pentachlorophenol, 4-bromophenol, 2.4.6-tribromophenol, 5-chloro-2-hydroxtoluene, 2-chloro-4-amyl phenol, 4-nitrophenol, 4-aminophenol, 3-dimethylaminophenol, 4-acetylaminophenol, 1-naphthol, 2-naphthol, 5-chloronaphthol-1, 4-chloronaphthol-1, 2-chloronaphthol-1, 1-chloronaphthol-2, 1-hydroxy-tetrahydro-(5.6.7.8)-naphthalene, 4-ureidophenol, 4-thioureidophenol; ammonia, methylamine, ethylamine, propylamine, cyclopropylamine, isopropylamine, butylamine, sec. butylamine, isobutylamine, isoamylamine, cyclohexylamine.

The active substances can be used in solvents, as emulsions or as dusting agents; the compounding of the active substances depends entirely on the intended use.

Should a stimulating action be required, then naturally auxiliary substances which are as biologically indifferent as possible or are even beneficial, will be chosen; on the other hand if a toxic action is the chief consideration, this can be increased by the choice of carrier substances which themselves have a phytotoxic action.

Solvents such as, in particular, alcohols; ketones such as acetone, diacetone alcohol or cyclohexanone; aliphatic hydrocarbons such as kerosene, and cyclic hydrocarbons such as benzene, toluene, xylene, tetrahydronaphthalene, alkylated naphthalenes, also chlorinated hydrocarbons such as tetrachlorethane, ethylene chloride and finally also high boiling organic solvents such as mineral and vegetable oils, or mixtures of the above named substances can be used for the production of solutions.

Chiefly emulsions and dispersions are meant by aqueous forms of application. The substances as such or in one of the above named solvents, are homogeneously incorporated into water, preferably by means of wetting or dispersing agents. On the other hand, concentrates suitable for dilution with water can be produced which consist of active ingredient, emulsifier or disperser and possibly, a solvent.

Quaternary ammonium compounds; soap, soft soap, aliphatic sulphuric acid monoesters having long chains, aliphatic aromatic sulphonic acids, alkoxy acetic acids having long chains; polyethylene ethers or fatty alcohols and polyethylene condensation products can be named as examples of cation active, anion active and non-ionogenic emulsifying or dispersing agents respectively.

Dusting agents can be made simply by mixing or grinding together the active ingredient and a solid carrier. As such solid carriers can be named: talcum, diatomaceous earth, kaolin, bentonite, calcium carbonate, boric acid, tricalcium phosphate, also powdered wood, powdered cork, charcoal and other materials of vegetable origin. On the other hand the substances can also be drawn on to the carriers by means of a volatile solvent. Pulverulent preparations and pastes can be suspended in water by the addition of wetting agents and protective colloids and so used as spraying agents.

The various forms of application can be adapted to the intended use in the usual way by the addition of substances which improve the distribution, the adhesive properties, resistance to rain and, possibly, the penetrating powers. Such substances are, for example, fatty acids, resins, wetting agents, glue, casein or alginates. In the same way, the biological activity can be increased by the addition of substances which have a bactericidal or fungicidal action or of substances which also influence the growth of plants. Fertilisers may also be added.

A few chosen examples follow which illustrate the range of application described above. The results are also given.

*Example 1*

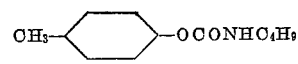

Soya beans dipped in 15 ccm. of an emulsion containing 0.5% of active ingredient sprouted roots just over the place dipped.

The following compounds were found to have a similar stimulating action on the root formation of various test plants: O-(4-methyl-phenyl)-isoamyl carbamate, O-(2-methyl-phenyl)- and O-(4-methyl-phenyl)cyclohexyl carbamate.

*Example 2*

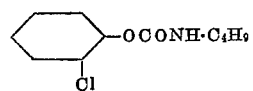

Soya bean plants 2 weeks old sprayed with an emulsion containing ½% of active ingredient lost all their leaves in 7 days.

Example 3

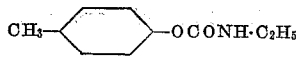

25–50 seeds on filter paper in petri dishes were treated with 5 ccm. of an emulsion containing 0.1% of active ingredient. Observation of the percentage of germinating seeds and of the top growth and root growths showed the following results:

Radish _____ 1.75
Cucumber _____ 7
Rye grass _____ 0

(10 = normal growth, 0 = no growth.)

Example 4

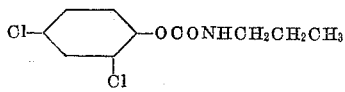

Test method the same as in Example 3.

Radish _____ 0.4
Cucumber _____ 4.54
Rye grass _____ 0

The following compounds for example have a similar selective inhibitory action on the germination and growth of plants: O-(2-methyl-phenyl)- and O-(4-methyl-phenyl)-methyl carbamate, O-(2-methyl-phenyl)- and O-(4-methyl-phenyl)-ethyl carbamate, and O-(2-methyl-phenyl)-n-propyl carbamate.

Example 5

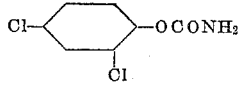

Test method as in Example 3.
Radish _____ 0
Cucumber _____ 0
Rye grass _____ 0

Germination of the above mentioned seeds is completely arrested with the same concentration of, for example, O-(2-methyl-phenyl)- and O-(4-methyl-phenyl)-carbamate.

What we claim is:

1. A method of influencing the growth of plants which comprises treating the plants in an amount and concentration sufficient to influence the growth of plants with a compound of the formula:

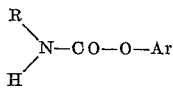

wherein Ar represents an aryl radical substituted by a member selected from the group consisting of halogen, alkyl, alkoxy and nitro groups, and R represents a member selected from the group consisting of hydrogen and a straight chain lower alkyl radical.

2. A method of stimulating the growth of plants which comprises treating the plants with a compound as defined in claim 1 in an amount and concentration sufficient to stimulate the growth of plants.

3. A method of inhibiting the growth of plants which comprises treating the plants with a compound as defined in claim 1 in an amount and concentration sufficient to inhibit the growth of plants.

4. A method of desiccating crop plants which comprises treating the plants with a compound as defined in claim 1 in an amount and concentration sufficient to desiccate crop plants.

5. A method of defoliating crop plants which comprises treating the plant with a compound as defined in claim 1 in an amount and concentration sufficient to defoliate crop plants.

6. A method of inhibiting weed growth without influencing the growth of the crop plant which comprises treating the plant crop with a compound as defined in claim 1 in an amount and concentration sufficient to inhibit weed growth.

7. A method of eradicating plants of all kinds where no vegetation is wanted which comprises treating the plants with a compound as defined in claim 1 in an amount and concentration sufficient to eradicate plants of all kinds.

8. A plant growth influencing composition comprising in an amount and concentration sufficient to influence the growth of plants, a compound of the formula:

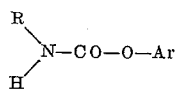

wherein Ar represents an aryl radical substituted by a member selected from the group consisting of halogen, alkyl, alkoxy and nitro groups, and R represents a member selected from the group consisting of hydrogen and a straight chain lower alkyl radical, and a solid pulverulent carrier.

9. A plant growth influencing composition comprising in an amount and concentration sufficient to influence the growth of plants, a compound of the formula:

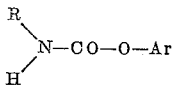

wherein Ar represents an aryl radical substituted by a member selected from the group consisting of halogen, alkyl, alkoxy and nitro groups, and R represents a member selected from the group consisting of hydrogen and a straight chain lower alkyl radical, and as carrier a surface active agent.

10. A plant growth influencing composition comprising in an amount and concentration sufficient to influence the growth of plants, a compound of the formula:

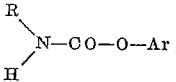

wherein Ar represents an aryl radical substituted by a member selected from the group consisting of halogen, alkyl, alkoxy and nitro groups, and R represents a member selected from the group consisting of hydrogen and a straight chain lower alkyl radical, and as carrier a high boiling organic solvent.

11. A plant growth stimulating composition comprising in an amount and concentration sufficient to stimulate the growth of plants, a compound of the formula:

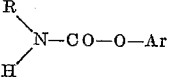

wherein Ar represents an aryl radical substituted by a member selected from the group consisting of halogen, alkyl, alkoxy and nitro groups, and R represents a member selected from the group consisting of hydrogen and a straight chain lower alkyl radical, and a solid pulverulent carrier.

12. A plant growth inhibiting composition comprising in an amount and concentration sufficient to inhibit the growth of plants, a compound of the formula:

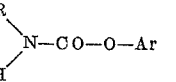

wherein Ar represents an aryl radical substituted by a member selected from the group consisting of halogen, alkyl, alkoxy and nitro groups, and R represents a member selected from the group consisting of hydrogen and a straight chain lower alkyl radical, and a solid pulverulent carrier.

References Cited in the file of this patent

UNITED STATES PATENTS

| | | |
|---|---|---|
| 2,412,510 | Jones | Dec. 10, 1946 |
| 2,677,698 | Deutschman et al. | May 4, 1954 |

OTHER REFERENCES

Thompson et al.: "Botanical Gazette," vol. 107 (1946), pages 475–507.